United States Patent
Lee

(10) Patent No.: US 7,197,688 B2
(45) Date of Patent: Mar. 27, 2007

(54) METHOD OF DETECTING BROADCASTING TABLE CHANGE

(75) Inventor: Jae-hoon Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 558 days.

(21) Appl. No.: 10/696,556

(22) Filed: Oct. 30, 2003

(65) Prior Publication Data
US 2004/0143785 A1 Jul. 22, 2004

(30) Foreign Application Priority Data
Dec. 2, 2002 (KR) ............ 10-2002-0076034

(51) Int. Cl.
*H03M 13/00* (2006.01)

(52) U.S. Cl. .............. 714/781; 714/800; 725/44; 455/3.02

(58) Field of Classification Search .......... 714/781, 714/800; 725/44; 455/3.02
See application file for complete search history.

(56) References Cited

U.S. PATENT DOCUMENTS 6,480,551 B1 * 11/2002 Ohishi et al. ............... 375/260
6,763,522 B1 * 7/2004 Kondo et al. ................ 725/39

FOREIGN PATENT DOCUMENTS

KR 2000-0076757 A 12/2000

* cited by examiner

*Primary Examiner*—Guy J. Lamarre
(74) *Attorney, Agent, or Firm*—Sughrue Mion, PLLC

(57) ABSTRACT

A method of detecting a change in a broadcasting table indicating broadcasting information from cyclic redundancy check (CRC) data of section information of a broadcasting stream. The method includes: storing section information of a broadcasting stream including a version number, a section number, table information, and cyclic redundancy check data; comparing cyclic redundancy check data of first input table information in the section number of the broadcasting stream with cyclic redundancy check data of subsequent input table information in the section number of the broadcasting stream; and parsing and updating the table information if the cyclic redundancy check data is changed.

3 Claims, 3 Drawing Sheets

METHOD OF DETECTING BROADCASTING TABLE CHANGE

BACKGROUND OF THE INVENTION

This application claims the priority of Korean Patent Application No. 2002-76034, filed on Dec. 2, 2002, in the Korean Intellectual Property Office, the disclosure of which is incorporated herein in its entirety by reference.

1. Field of the Invention

The present invention relates to a method of processing a broadcasting signal, and more particularly, to a method of detecting a change in a broadcasting table indicating broadcasting information from cyclic redundancy check (CRC) data of section information of a broadcasting stream.

2. Description of the Related Art

Digital televisions (DTVs) obtain a variety of tables by parsing sections of Program Specific Information (PSI: channel information or an information table with an ID of video or audio), which is a standard of the Motion Picture Expert Group (MPEG), or sections of a Program and System Information Protocol (PSIP), which is a standard of the Advanced Television System Committee (ATSC). The DTVs perform various functions using video, audio, electronic program guide (EPG), time, and channel information included in the variety of tables. Here, sections to which the tables belong are repeatedly input from a broadcasting stream and use a 5-bit version number to determine whether a currently input table is a parsed table. In a case where the version number is not changed in spite of changes in contents of the tables or broadcasting streams with the same version number are consecutively input, the DTVs may not work properly.

FIG. 1 is a flowchart explaining a method of detecting a change in a broadcasting table according to the prior art. Referring to FIG. 1, in step 100, information on a version of a table header is read. In step 101, a determination is made as to whether the version is new or updated. If in step 101, it is determined that the version is new or updated, in step 102, the table is parsed, and then in step 103, the table is updated.

A version of a table basically indicates whether data of a new version of a table is different from data of a previous version of a table, i.e., data of a table is changed. Thus, the determination as to whether the table is changed is generally made using the version. However, since the version is composed of 5 bits in a section, the same version occurs in every 32 bits of the section. A virtual version number is mainly 0, 1, 2, or the like. Thus, when the broadcasting stream is changed to be broadcast, the same version of the broadcasting stream may be broadcast. In addition, since DTVs have just been introduced, a broadcasting station sometimes transmits wrong data or does not change the version even when contents of the table are changed. In this case, a TV screen is not displayed or malfunctions.

SUMMARY OF THE INVENTION

The present invention provides a method of detecting a change in a broadcasting table indicating broadcasting information from CRC data of section information of a broadcasting stream in order to reduce the possibility that a DTV, for example, will abnormally operate.

According to an aspect of the present invention, there is provided a method of detecting a change in a broadcasting table. The method includes: storing section information of a broadcasting stream including a version number, a section number, table information, and cyclic redundancy check data; comparing cyclic redundancy check data of first input table information in the section number of the broadcasting stream with cyclic redundancy check data of subsequent input table information in the section number of the broadcasting stream; and parsing and updating the table information.

According to another aspect of the present invention, there is provided a method of detecting a change in a broadcasting table. The method includes: storing section information including a section number and cyclic redundancy check data; comparing cyclic redundancy check data of first input table information with cyclic redundancy check data of subsequent input table information; and parsing and updating the table information if the cyclic redundancy check data is changed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail with reference to the attached drawings.

Figure 1:
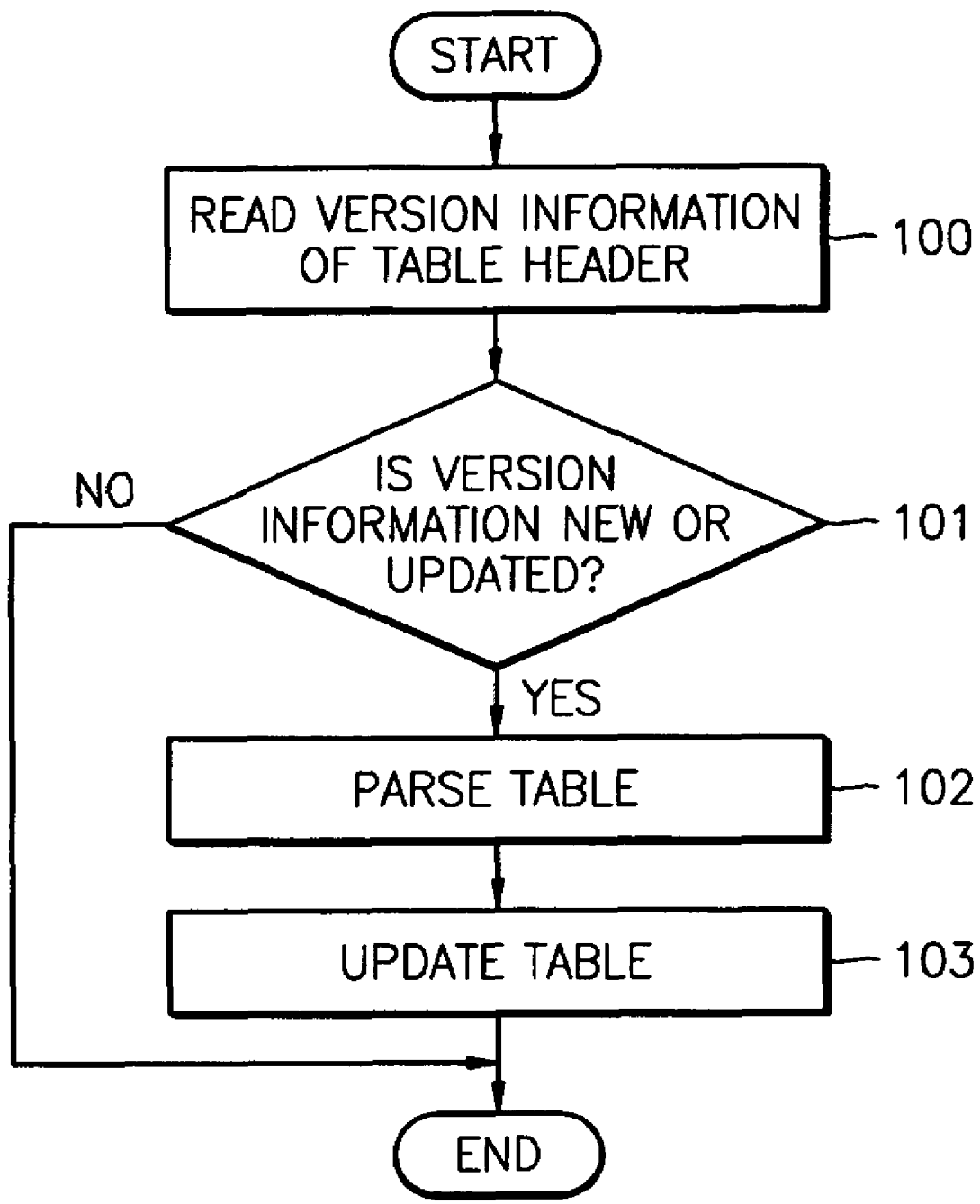
FIG. 1 is a flowchart explaining a method of detecting a change in a broadcasting table according to the prior art.
Figure 2:
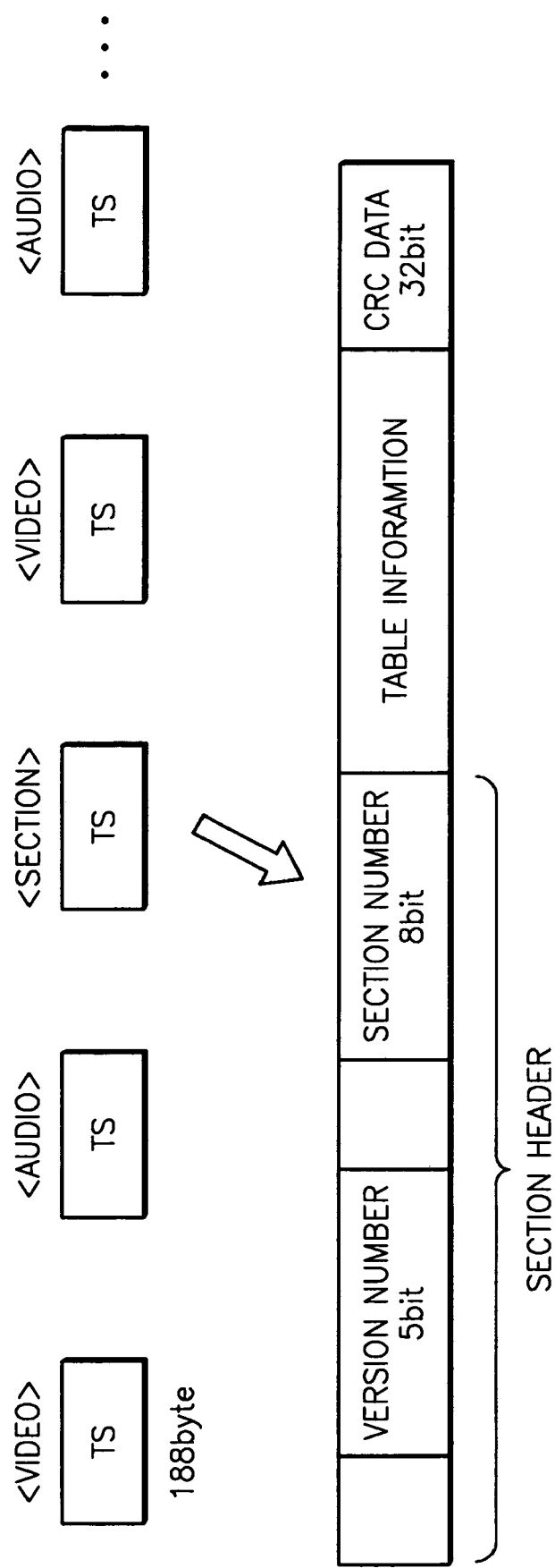
FIG. 2 is a view illustrating a format of section information for explaining a method of changing a broadcasting table.
Figure 3:
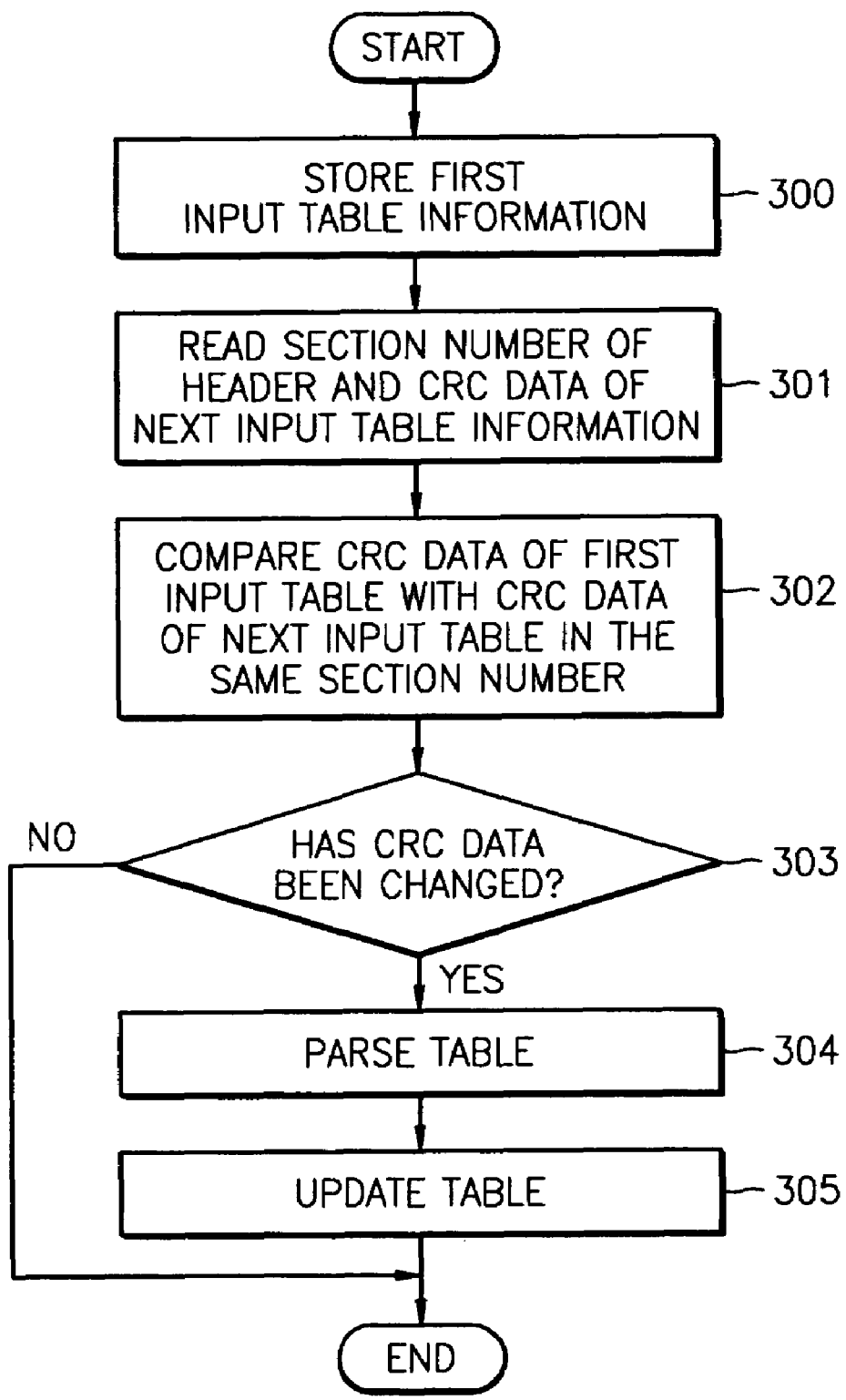
FIG. 3 is a flowchart explaining a method of detecting a change in a broadcasting table according to the present invention.

FIG. 2 shows a format of section information for explaining a method of changing a broadcasting table, and FIG. 3 is a flowchart explaining a method of detecting a change in a broadcasting table according to the present invention.

In step 300, first input table information of a section is stored. In step 301, next input table information is stored and a section number of a header of the section and CRC data of the section are read. In step 302, CRC data of the first input table information and CRC data of the next input table information in the same section number are compared. In step 303, a determination is made as to whether the CRC data is changed. If in step 303, it is determined that the CRC data is changed, in step 304, the table is parsed. In step 305, the table is updated.

The present invention will be described in more detail with reference to FIGS. 2 and 3.

As shown in FIG. 2, a broadcasting station transmits a broadcasting signal to a DTV, for example, on a 188-byte transport stream (TS)-by-188-byte TS basis. The TSs are 188-byte video, audio, and section information, respectively. The section information is located at a middle position to obtain a broadcasting information table and includes a section header with a 5-bit version number and an 8-bit section number, table information, and a 32-bit CRC data.

Available tables for current broadcasting are stored and used for other functions. Here, CRC data of section information is also stored in each of structures in which the tables are stored. In most cases, one table is stored in one section. Sometimes one table is stored in several sections. Thus, CRC data of a section is stored like a section number in a section header. CRC data stored in each table is repeatedly compared with CRC data of tables which are input from a broadcasting stream to determine whether the input tables are new tables and then to selectively parse the input tables.

A method of detecting a change in a broadcasting table will now be explained with reference to FIG. 3. In step 300, first input table information of a section of a broadcasting stream is stored. In other words, as shown in FIG. 2, a section header with a 5-bit version number and an 8-bit section number, table information, and 32-bit CRC data are stored. In step 301, next input table information is stored and a section number of a header and CRC data of the next input table information are read. In step 302, CRC data of the first input table information and CRC data of the next input table information in the same section number are compared. In step 303, a determination is made as to whether the CRC data is changed. Here, since the inherent function of CRC data is check sum, a value of the CRC data varies even if one kind of data of a section is changed and thus useful to detect whether contents of other tables are changed. In addition, the CRC data is 32-bit data and the probability that 32-bit CRC data is the same is one to four Giga. Thus, the detection of a change in a broadcasting table through the comparison between 32-bit CRC data is more accurate than that through the comparison between version numbers according to the conventional technology. Even when one of contents of a table is changed, CRC data is changed. Thus, CRC data of first input section information can be compared with CRC data of next input section information to detect a change in a broadcasting table.

If in step 303, it is determined that the CRC data is changed, in step 304, the table is parsed, and then in step 305, the table is updated.

Since, for example, current DTV broadcasting is yet at an initial stage, an error frequently occurs in data transmitted from a broadcasting station. Even when the contents of a table are changed, the same version is sometimes displayed. Also, while the version has a value from 0 to 31, a virtually broadcast stream mainly has a low version value such as 0, 1, or 2. Thus, in an event that a stream produced in another broadcasting station is transmitted, the produced stream may have the same version as the virtually broadcast stream. Accordingly, the above problems can be solved by checking CRC data.

As described above, according to the present invention, the probability that a DTV, for example, will abnormally operate can be reduced by detecting a change in a table indicating broadcasting information from CRC data of section information of a broadcasting stream.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of detecting a change in a broadcasting table, the method comprising:

storing section information of a broadcasting stream comprising a version number, a section number, table information, and cyclic redundancy check data;

comparing cyclic redundancy check data of first input table information in the section number of the broadcasting stream with cyclic redundancy check data of subsequent input table information in the section number of the broadcasting stream; and parsing and updating the table information if the cyclic redundancy check data is changed.

2. A method of detecting a change in a broadcasting table, the method comprising:

storing section information comprising a section number and cyclic redundancy check data;

comparing cyclic redundancy check data of first input table information with cyclic redundancy check data of subsequent input table information; and parsing and updating the table information if the cyclic redundancy cheek data is changed.

3. The method according to claim 2, wherein the cyclic redundancy check data of the first input table information and the cyclic redundancy check data of the subsequent input table information are in a same section number.

* * * * *